United States Patent [19]
Kawamoto

[11] Patent Number: 6,075,993
[45] Date of Patent: *Jun. 13, 2000

[54] PERSONAL STATION AND INFORMATION PROVIDING SYSTEM

[75] Inventor: Yoji Kawamoto, Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/557,625

[22] Filed: Nov. 14, 1995

[30] Foreign Application Priority Data

Nov. 16, 1994 [JP] Japan .................................. 6-306972
Mar. 28, 1995 [JP] Japan .................................. 7-069104

[51] Int. Cl.$^7$ ...................................................... H04Q 7/20
[52] U.S. Cl. ............................................ 455/456; 455/457
[58] Field of Search ........................ 379/58, 59; 455/33.1, 455/51.1, 67.1, 132, 456, 457; 342/450, 453

[56] References Cited

U.S. PATENT DOCUMENTS

| | | | |
|---|---|---|---|
| 4,433,335 | 2/1984 | Wind | 342/453 |
| 4,494,119 | 1/1985 | Wimbush | 342/457 |
| 4,665,404 | 5/1987 | Christy | 342/463 |
| 4,698,781 | 10/1987 | Cockerell, Jr. | 342/451 |
| 4,706,689 | 11/1987 | Man | 379/59 |
| 4,728,959 | 3/1988 | Maloney | 342/457 |
| 4,742,357 | 5/1988 | Rackley | 342/450 |
| 5,055,851 | 10/1991 | Sheffer | 455/33.1 |
| 5,056,106 | 10/1991 | Wang | 342/450 |
| 5,095,500 | 3/1992 | Tayloe | 379/59 |
| 5,218,367 | 6/1993 | Sheffer | 379/59 |
| 5,218,618 | 6/1993 | Sagey | 379/59 |
| 5,293,645 | 3/1994 | Sood | 379/58 |
| 5,379,451 | 1/1995 | Nakagoshi | 455/435 |
| 5,420,883 | 5/1995 | Swenson | 342/450 |
| 5,432,841 | 7/1995 | Rimmer | 379/59 |
| 5,508,707 | 4/1996 | LeBlanc | 379/59 |
| 5,515,378 | 5/1996 | Roy, III | 379/58 |
| 5,515,419 | 5/1996 | Sheffer | 455/456 |
| 5,519,760 | 5/1996 | Borkowski | 379/59 |
| 5,524,136 | 6/1996 | Bar-Nay | 379/59 |
| 5,570,412 | 10/1996 | LeBlanc | 379/59 |
| 5,592,180 | 1/1997 | Yokev | 342/450 |
| 5,600,706 | 2/1997 | Dunn | 379/59 |
| 5,613,202 | 3/1997 | Ishida | 455/457 |
| 5,613,205 | 3/1997 | Dufour | 455/33.1 |
| 5,787,354 | 7/1998 | Gray et al. | 455/456 |

*Primary Examiner*—Daniel S. Hunter
*Assistant Examiner*—Myron K. Wyche
*Attorney, Agent, or Firm*—Frommer Lawrence & Haug, LLP.; William S. Frommer; Dennis M. Smid

[57] ABSTRACT

An object of the present invention is to provide a personal station (hereinafter referred to as PS) for use with a location information detecting system using a personal handyphone system (hereinafter referred to as PHS) for detecting the moving direction of the PS along with the location thereof. After the user initially registers the present location to the PS and inputs the address of the destination, the PS calculates the distance from the present location to the destination and displays the result. When the user moves, the PS detects the present location and moving direction thereof by a method using electric field intensities, angle with cell stations (hereinafter referred to as CSs), an atomic clock, and so forth. Thereafter, the PS determines whether or not the detected present location is correct. When the detected present location is correct, the PS calculates the distance from the present location to the destination and displays the result. When the user has arrived at the destination, the PS completes the entire flow.

14 Claims, 11 Drawing Sheets

PERSONAL STATION AND INFORMATION PROVIDING SYSTEM

BACKGROUND OF THE INVENTION

1. Field of the Invention

The present invention relates to a personal station (PS) that detects the present location and performs navigation corresponding to cell station numbers and control carriers or communication carriers of a personal handyphone system (PHS).

2. Description of the Prior Art

Figure 6:
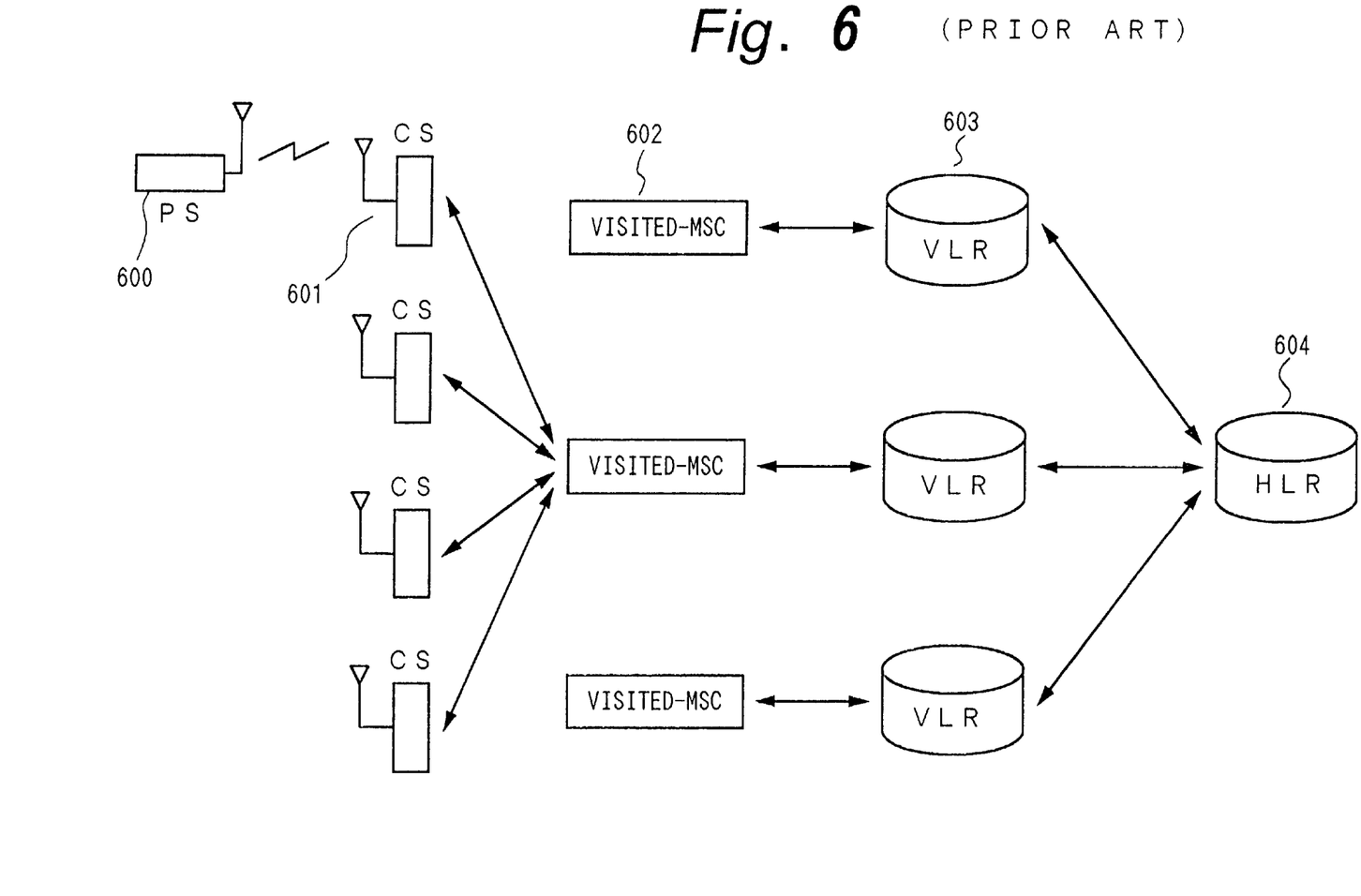
FIG. 6 is a block diagram showing an example of the construction of a PHS using a conventional PS.

A location information detecting system for use with a PHS has been proposed. FIG. 6 shows an example of the construction of the proposed location information detecting system. In FIG. 6, reference numeral 600 is a personal station (hereinafter referred to as a PS). Each PS is designated a unique PS number. Reference numeral 601 is a cell station (hereinafter referred to as a CS). CSs are disposed at intervals of around 100 meters. Each CS is designated a unique CS number. Reference numeral 602 is a visited mobile service switching center (referred to as a visited-MSC) that controls connections of incoming calls and outgoing calls in a radio region. Reference numeral 603 is a visitor location register (hereinafter referred to as VLR) that stores location information and so forth of a PS that is present in a visited-MSC. Reference numeral 604 is a home location register (hereinafter referred to as an HLR) that stores subscriber information, location information, and so forth. A plurality of CSs 601 are connected to a visited-MSC. An area managed by the visited-MSC is referred to as a simultaneous paging area.

Figure 7:
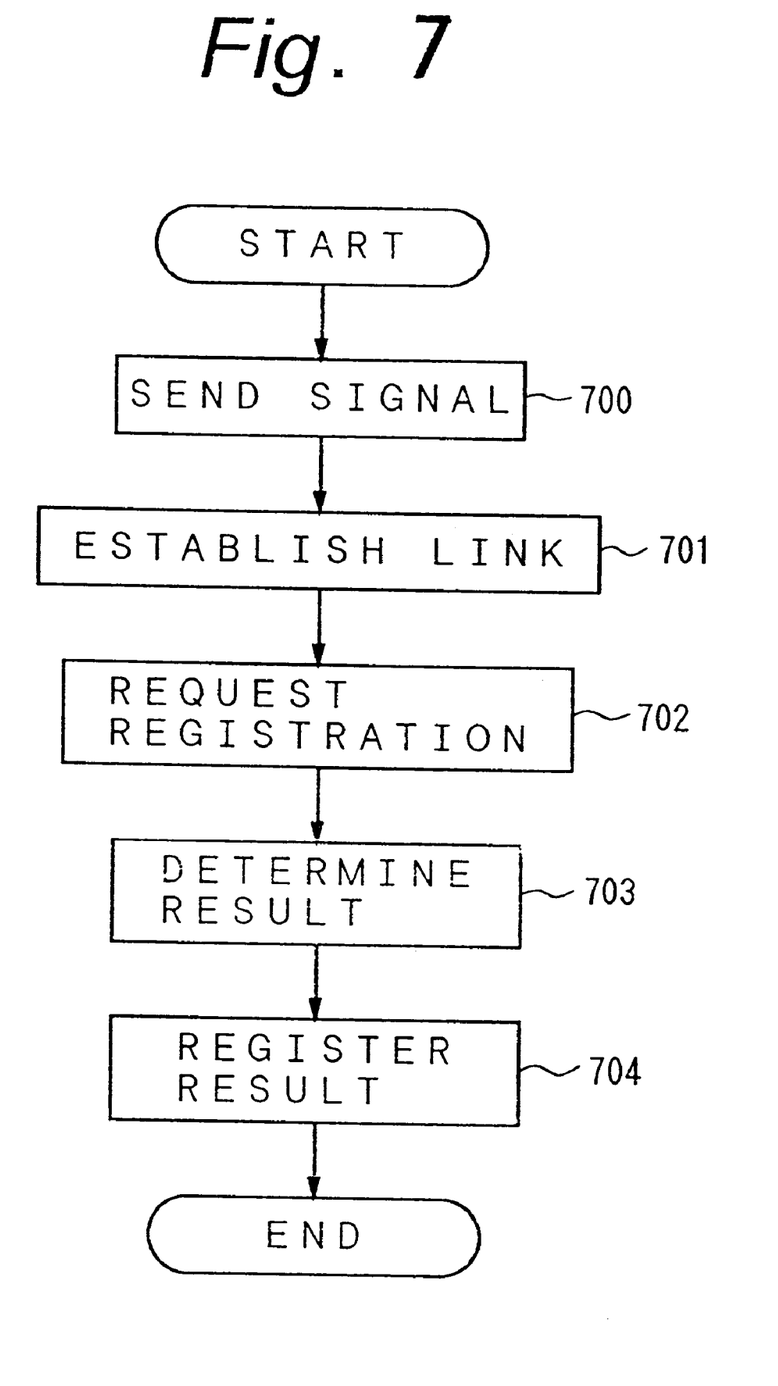
FIG. 7 is a flow chart showing a location information detecting method for the PHS using the conventional PS.

Next, the method for registering the location information of the present location of a user with a PS 600 will be described with reference to FIGS. 6 and 7. FIG. 7 is a flow chart in the case that the user initially registers the location information to the VLR 603 of the PS 600. At step 700, when the user moves and thereby the simultaneous paging area of the user varies or when the user requests the CS 601 to register the location information, a signal for registering the location information is transmitted from the PS 600 to an adjacent CS 601. This signal is automatically or manually transmitted.

When the signal is transmitted at step 700, the flow advances to step 701. At step 701, a radio communication link is established between the CS 601 and the PS 600. Thereafter, at step 702, the PS 600 sends a location information registration request signal to the CS 601. The location information registration request signal is sent to the visited-MSC 602 through the CS 601. At step 703, the visited-MSC 602 determines whether or not the PS 600 that has sent the request signal is a subscriber of the system corresponding to subscriber information stored in the HLR 604. When the PS 600 is a subscriber of the system, at step 704, the PS number included in the location information registration request signal received from the PS 600 is stored in the VLR 603. Thus, the location registration process is completed.

It should be noted that a system that performs the function of the VLR with the HLR is possible. In addition, to register more precise location information, a CS number designated to each CS may be stored in the VLR.

In such a system, when the PS with a subscriber number accesses the VLR (or the HLR), the PS can detect the area thereof the PS. However, so far, the function of allowing the PS to actively detect its location using the PHS has not been proposed. Thus, in the conventional system, the user only obtains information of which the user is present in the vicinity of a CS.

In the conventional location information detecting system, the VLR (or HLR) stores at most visited-MSC numbers (or cell station numbers) as location information. Thus, the user cannot obtain the moving direction of the PS.

Therefore, an object of the present invention is to provide a personal station that can precisely detect the location thereof.

Another object of the present invention is to provide a personal station that can also detect the moving direction thereof.

OBJECTS AND SUMMARY OF THE INVENTION

To solve the above-described problem, the present invention is a personal station for performing a navigation for use with a personal handyphone system, comprising a detecting means for detecting the location of the personal station corresponding to control carriers or communication carriers received from cell stations and cell station numbers designated thereto, a memory for storing location information, a registering means for registering present location, and a display means for displaying the present location corresponding to the location information.

The user of the personal station according to the present invention can obtain the present location and the moving direction thereof and the distance to the destination.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
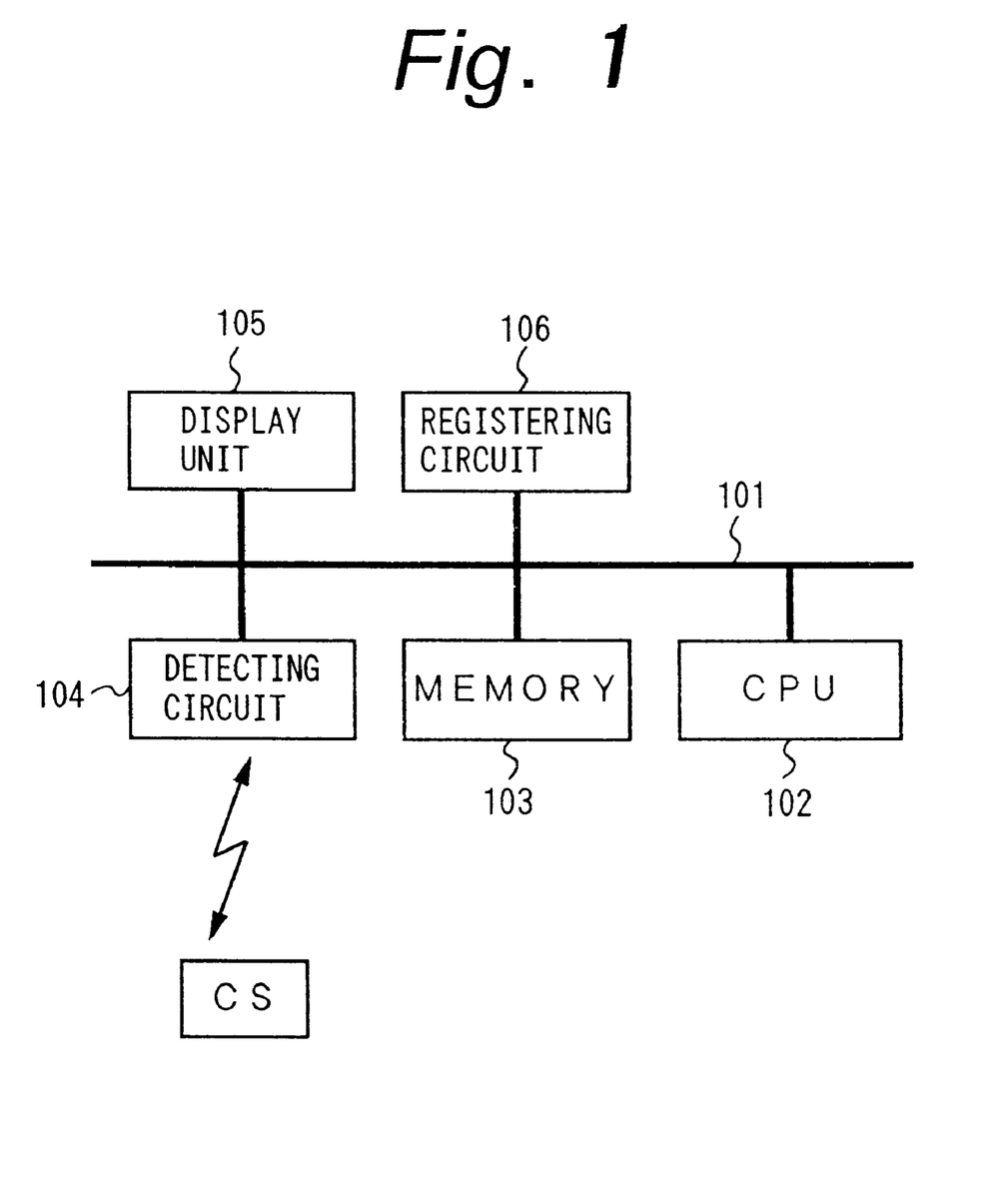
FIG. 1 is a block diagram showing the construction of a personal station according to the present invention.

Next, with reference to the accompanying drawings and flow charts, an embodiment of the present invention will be described. FIG. 1 shows the construction of a personal station (PS) according to an embodiment of the present invention. In FIG. 1, reference numeral 101 is a data bus of the PS. The data bus 101 is connected to a CPU 102, a memory 103, a detecting circuit 104, a display unit 105 (such as an LCD), and a registering circuit 106.

The PS is controlled by the CPU 102. The memory 103 stores location information for each area. The present location of the PS is detected by the detecting circuit 104. The present location of the PS is detected corresponding to control carriers or communication carriers and cell station numbers designated to individual CSs. The display unit 105 displays information such as the distance to the destination and the present position of the PS. The address of the destination, the present location of the PS, and so forth are registered in the registering circuit 106.

The CSs, the visited-MSCs, the VLRS, and the HLR of the embodiment are the same as those of the related art reference.

Figure 2:
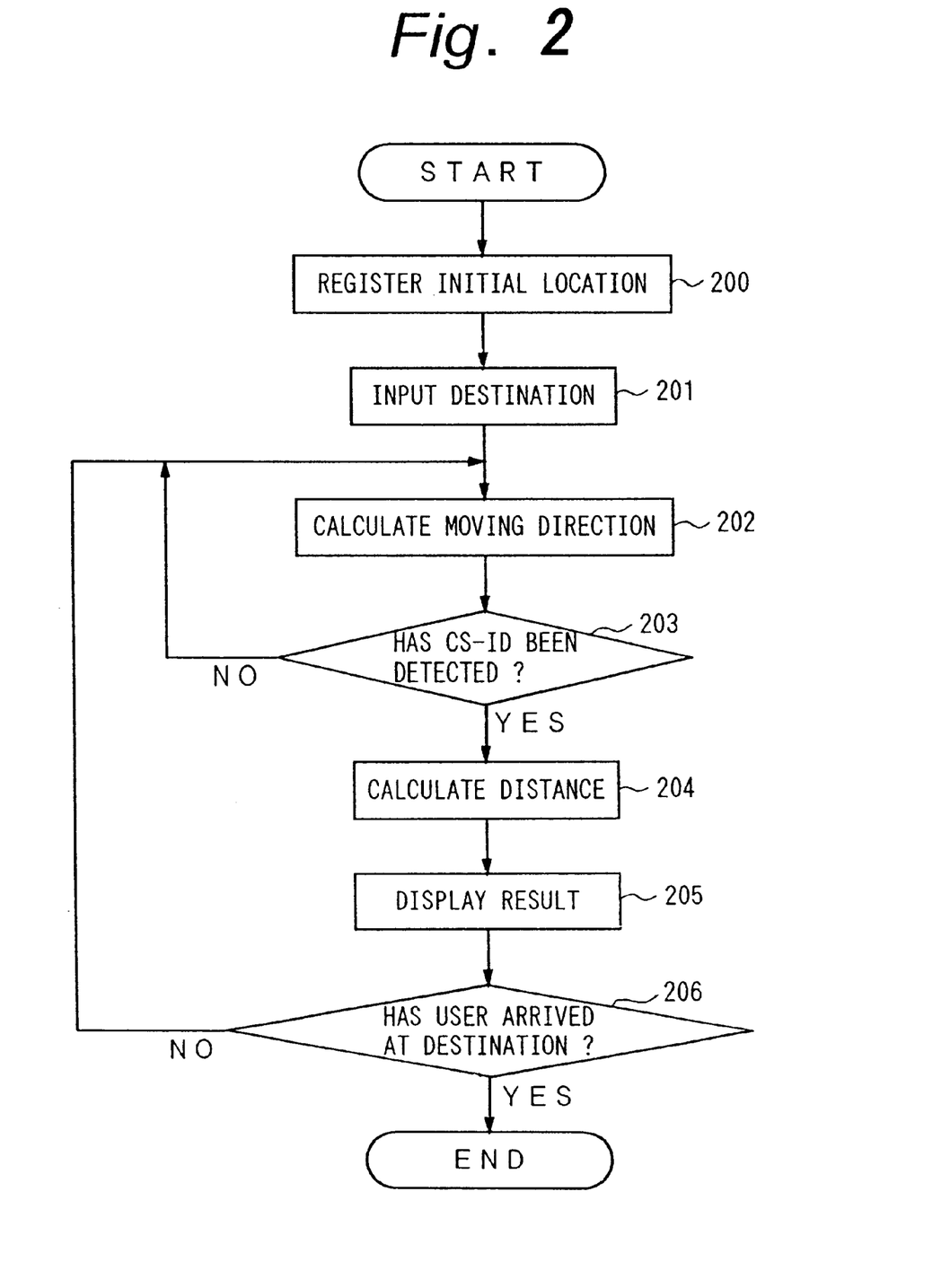
FIG. 2 is a flow chart showing a location information detecting method according to the present invention.

FIG. 2 is a flow chart showing a location information detecting method for a PS according to the present invention. Next, the detailed procedure of the present invention will be described corresponding to the flow chart. At step 200, before the location detection is performed by the PS, the user initially registers the present location of the PS.

Figure 3:
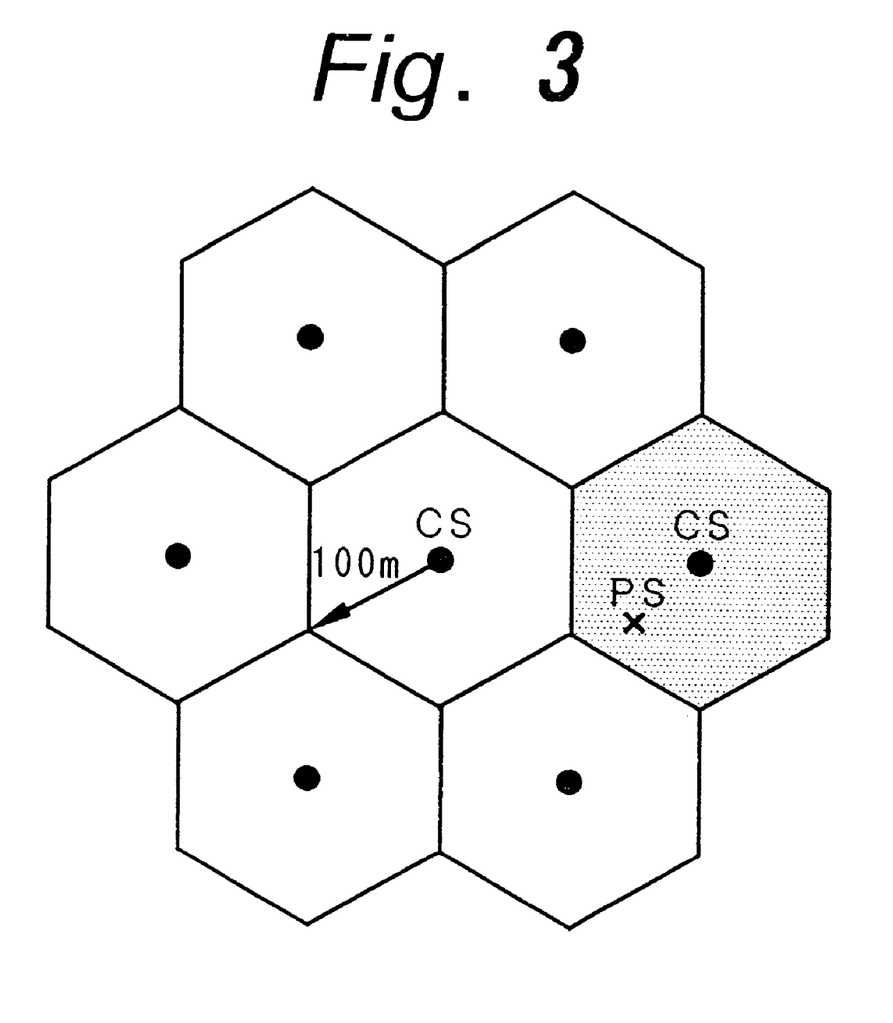
FIG. 3 is a conceptual schematic diagram showing the cell structure of cells of a personal handyphone system (PHS)

In the personal handyphone system (PHS), as shown in FIG. 3, CSs are disposed as cells at intervals of around 100 meters. Now, it is assumed that the PS is present at the location denoted by X in FIG. 3. At this point, the display unit 105 displays the present location of the PS corresponding to a CS-ID including a link channel designating/informing message that is sent and received upon the establishment of a radio communication link between the PS and the CS. Since individual CSs are designated unique CS-IDs, when the location of each CS-ID and the map thereof are stored in the memory 103, it is determined that the PS is present in an area with a radius of approximately 100 meters about the CS with which the PS has established the radio communication link.

At step 200, the display unit 105 displays the map stored in the memory 103. When the user inputs the present location (best estimated location), the location information is stored in the registering circuit 106 and the present location of the PS is displayed on the display unit 105.

In this case, as an input means, such as a cursor displayed along with the map on the display unit 105 can be conveniently moved by arrow keys, cross keys, or the like. Alternatively, the display unit 105 may be of a touch panel type. In this case, the user may directly designate a point on the map displayed on the display unit 105 with a pen type pointing device. At this point, the touch panel may be pressure-sensible or electrically sensible. The location may be designated with a dedicated pointing device. In this case, the user can precisely designate the location. As another alternative method, a dedicated map may be provided. With the map, the user may input desired coordinates so as to designate the location. After the user has input the location, the flow advances to step 201.

When the user wants to obtain the destination on the map, at step 201, he inputs the address of the destination to the PS. Thus, the address of the input destination is stored in the registering circuit 106. The CPU 102 searches the location of the PS and calculates the distance from the PS to the destination corresponding to the location information stored in the memory 103. As a result, the location of the destination, the map in the vicinity of the destination, and the distance from the present location of the PS to the destination are displayed on the display unit 105.

At step 202, when the PS moves from the location that has been initially registered at step 200, the detecting circuit 104 detects the present location and the moving direction of the PS. Next, the detecting method of the present location and the moving direction of the PS will be described. The location of a mobile substance can be detected in various manners. Next, methods using electric field intensities, the angle between CSs viewed from a PS, and an atomic clock will be exemplified.

Figure 4A:
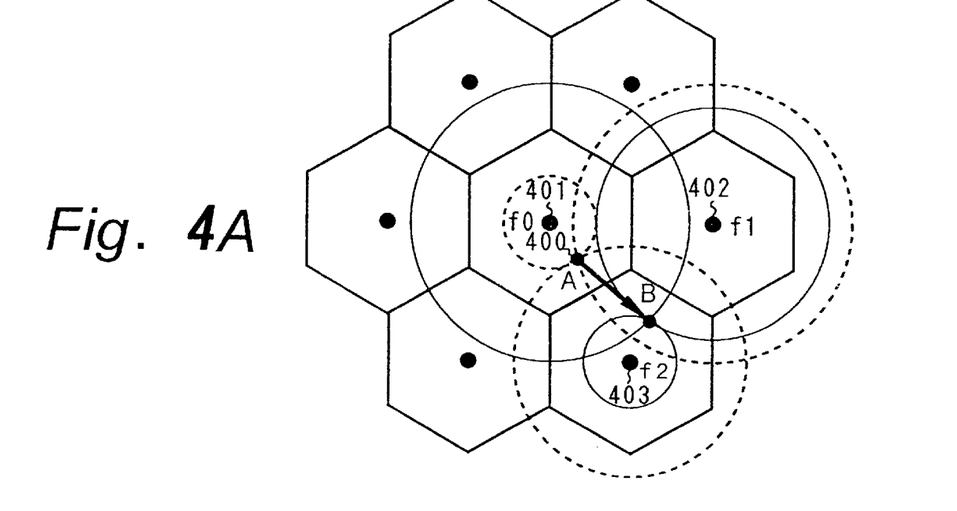
FIGS. 4A, 4B, and 4C, and 4D are conceptual schematic diagrams showing a method for a detecting circuit using electric field intensities of carrier frequencies of cell stations.
Figures 4B, 4C:
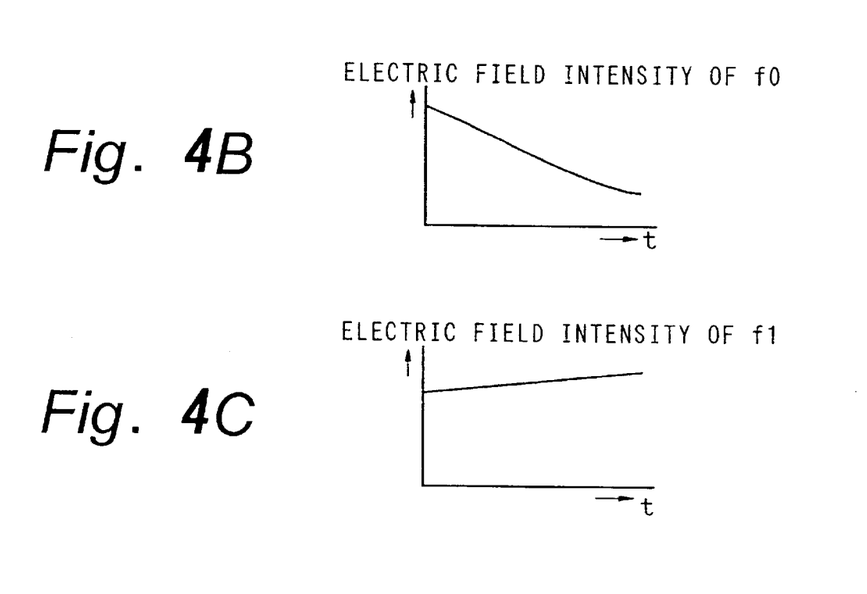
Figure 4D:
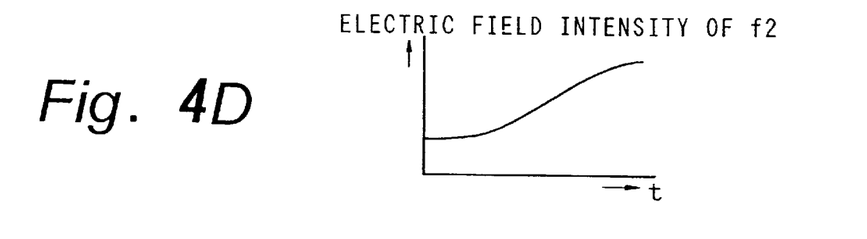

First, the method using the electric field intensities of communication carriers or control carriers supplied from CSs will be described. In the case that communication carriers are used, when different frequencies are designated to adjacent CSs, the location of a PS can be easily detected. FIGS. 4A, 4B, 4C and 4D show the theory of the method using the electric field intensities. When the user initially registers the location at step 200, it is assumed that the location of the PS 400 at a point A in the cell of the CS 401 has been stored in the registering circuit 106. When the PS 400 moves to a point B, the electric field intensities of the communication carriers of the CSs adjacent to the PS vary. The electric field intensity of the carrier frequency f0 of the CS 401 varies as shown in FIG. 4B. The electric field intensity of the carrier frequency f1 of the CS 402 varies as shown in FIG. 4C. The electric field intensity of the carrier frequency f2 of the CS 403 varies as shown in FIG. 4D. These electric field intensities are detected by the detecting circuit 104 of the PS. Thus, in this example, circles around the three CS 401, CS 402, and CS 403 are formed corresponding to the detected electric field intensities. Thus, it is determined that the PS 400 is present at a point of intersection of these circles.

In this case, when the electric field intensities of communication carriers of at least three CSs are used, the location of a PS is detected. However, since the distance between CSs is small, when four or more electric field intensities of communication carriers of CSs in a cell of a PS are used, the location of the PS can be more precisely detected.

Figure 11:
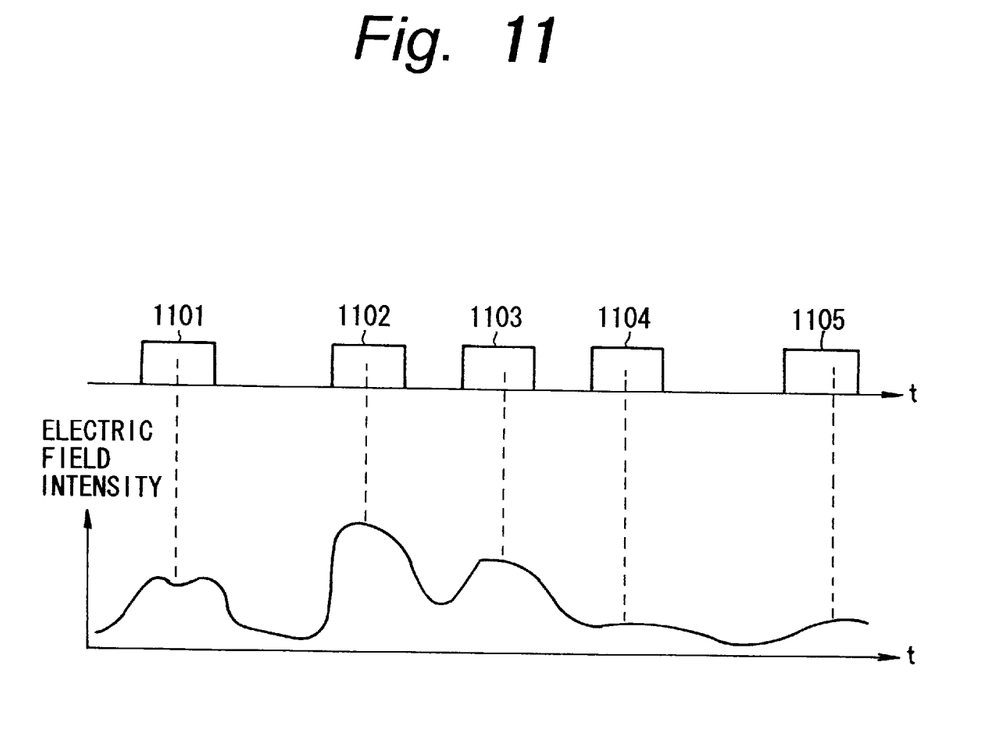
FIG. 11 is a schematic diagram showing the theory of a location information detecting method according to the present invention.

Next, the method using the control carriers will be described. In the PHS, micro cells are used. Thus, from a viewpoint of effective usage of frequencies, different time slots are intermittently transmitted on a control channel with the same frequency. At this point, the location of a PS is detected by measuring the electric field intensities of time slots of the control carriers. Now, it is assumed that the logical structure and electric field intensity of the control carrier f0 are shown in FIG. 11.

In this case, the higher electric field intensities of time slots are in the order of 1102, 1103, and 1101. Since each time slot is designated a unique CS-ID, the present location of the PS can be detected. However, only time slots in the direction from CSs to the PS can be used as electric field intensities.

As with the above-described method, the location of the PS can be more precisely detected when four or more electric field intensities are used.

Figure 5:
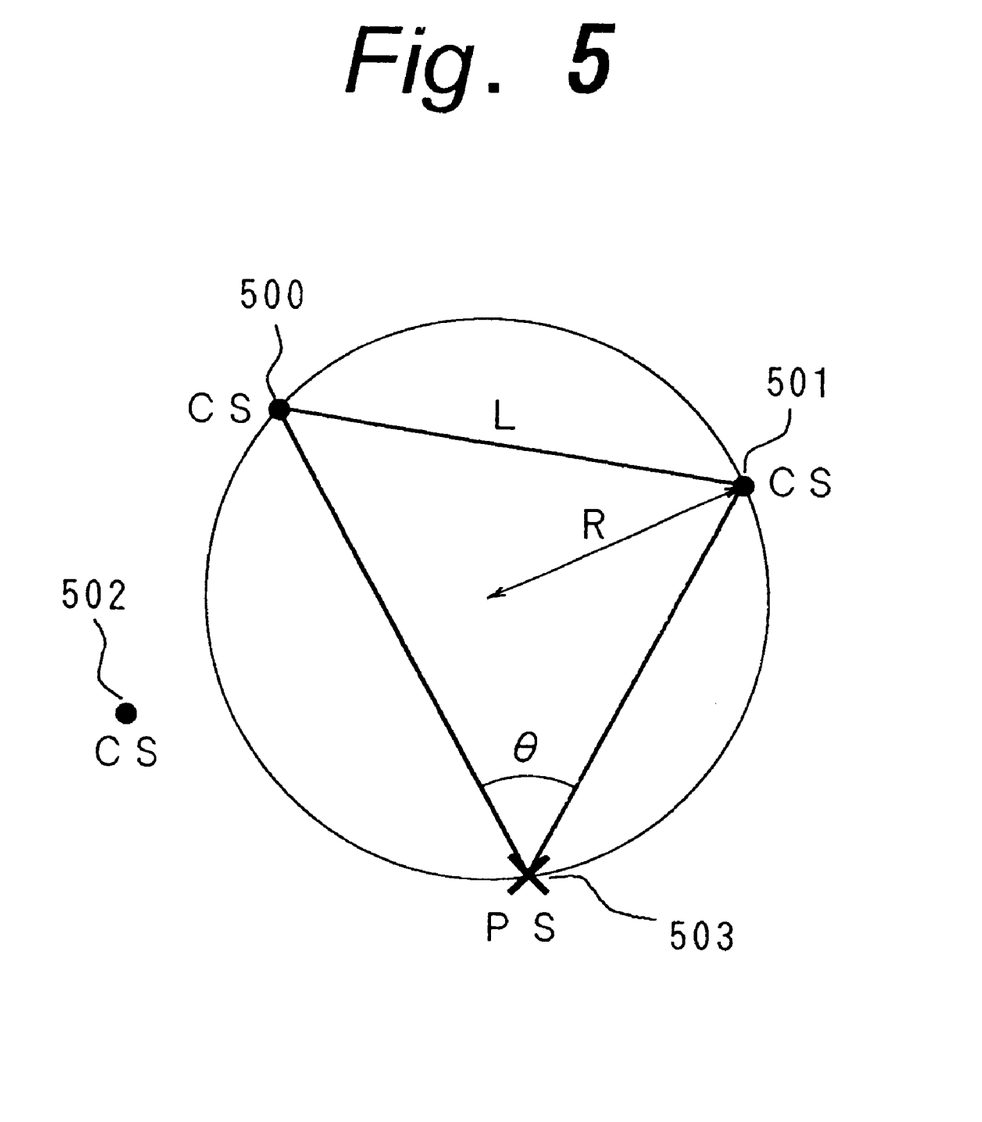
FIG. 5 is a conceptual schematic diagram showing a method for a detecting circuit using the angle between cell stations viewed from the user location and the distance between the cell stations.

Next, the method using the angle between two CSs viewed from a PS will be described. FIG. 5 shows the theory of the method. In FIG. 5, the carrier frequencies used for CS 500 and CS 501 are denoted by f3 and f4, respectively. An azimuth detector included in the detecting circuit 104 measures the azimuth from the PS 503 to the Cs 500 and the azimuth from the PS 503 to the CS 501 and calculates the angles e between the azimuths. At this point, the CS 500 and CS 501 are detected corresponding to their CS-IDs, communication carrier frequencies (f3 and f4), and so forth. Since the distance L between the CS 500 and CS 501 is known, the radius R of the circle that passes through the CS 500, CS 501, and PS 503 corresponding to the angle θ and the length L can be calculated by the sine theorem. When the same process is performed for the pair of the CS 501 and the CS 502 and the pair of the CS 500 and the CS 502, the location of the PS 503 can be detected.

Last, the method using the atomic clock will be described. In this method, very precise atomic clocks using rubidium or caesium are provided for CSs and a PS. A CS sends a known signal to other CSs and a PS at predetermined time intervals. The location of the PS is detected corresponding to the time difference or the phase difference of signals received by the PS. As with the above-described two methods, using at least three CSs, the radius of a circle that passes through the CSs and the PS, the location of the PS can be detected.

Thus, at step 202, the present location of the PS can be detected by one of the above-described three methods. The moving direction of the PS is displayed as an arrow or the like that shows the moving direction corresponding to the former location and the present location on the display unit 105. Alternatively, the moving direction is displayed as a locus on the display unit 105.

When the present location and the moving direction of the PS is detected by the detecting circuit 104 corresponding to one of the above-described methods, the flow advances to step 203. At step 203, it is determined whether or not the location detected at step 202 is correct. After the location of the PS is detected by the detecting circuit 104, when the radio communication link is established with an adjacent CS, the CS-ID thereof is detected. Thus, the CPU 102 determines whether or not the PS is present in the cell. When the CS-ID is different from that detected at step 202 and the PS is not present in the cell, the flow return to step 202. At step 202, the moving direction of the PS is detected. When it has been determined that the PS is present in the cell, the flow advances to step 204.

At step 204, when the user has input the destination at step 201, the CPU 102 uses the location information detected at step 203 and calculates the distance from the present location of the PS to the destination. When the user has not input the destination at step 201, the CPU 102 calculates the present location of the PS corresponding to the map information stored in the memory 103.

At step 205, the location information calculated at step 204 and the distance from the PS to the destination (in the case that the destination has been input at step 201) are displayed on the display unit 105 of the PS. At this point, when the user is moving and has not arrived at the destination at step 206, the flow returns to step 202. At step 202, the location of the PS is detected. On the other hand, when the user has arrived at the destination at step 206, the flow completes. When the user has not input the destination at step 201, the location detecting process from step 202 to 206 is repeated.

At this point, in the case that the PS has a clock function, when the elapse time is counted, an expected time required to get the destination can be displayed on the display unit 105 along with the distance from the location of the PS to the destination.

The location detecting process from step 202 to step 206 may be performed whenever the location information is displayed on the display unit 105. However, since the speed of a PHS user is a walking speed of a human being, the method for automatically detecting the location of the PS at predetermined intervals using a timer can be also effectively employed. When the process is performed corresponding to the flow chart, the location of the user with the PS can be detected and the user can be navigated to the destination.

It should be noted that the present invention is not limited to the above-described embodiment. Instead, the present invention can be applied to for example a personal station for use with a cellular telephone system.

Moreover, in the present invention, the modes of the portable telephone function and the navigation function may be selected.

Next, another embodiment of the present invention will be described. In this embodiment, a database server is disposed on a cell station side.

Figure 8:
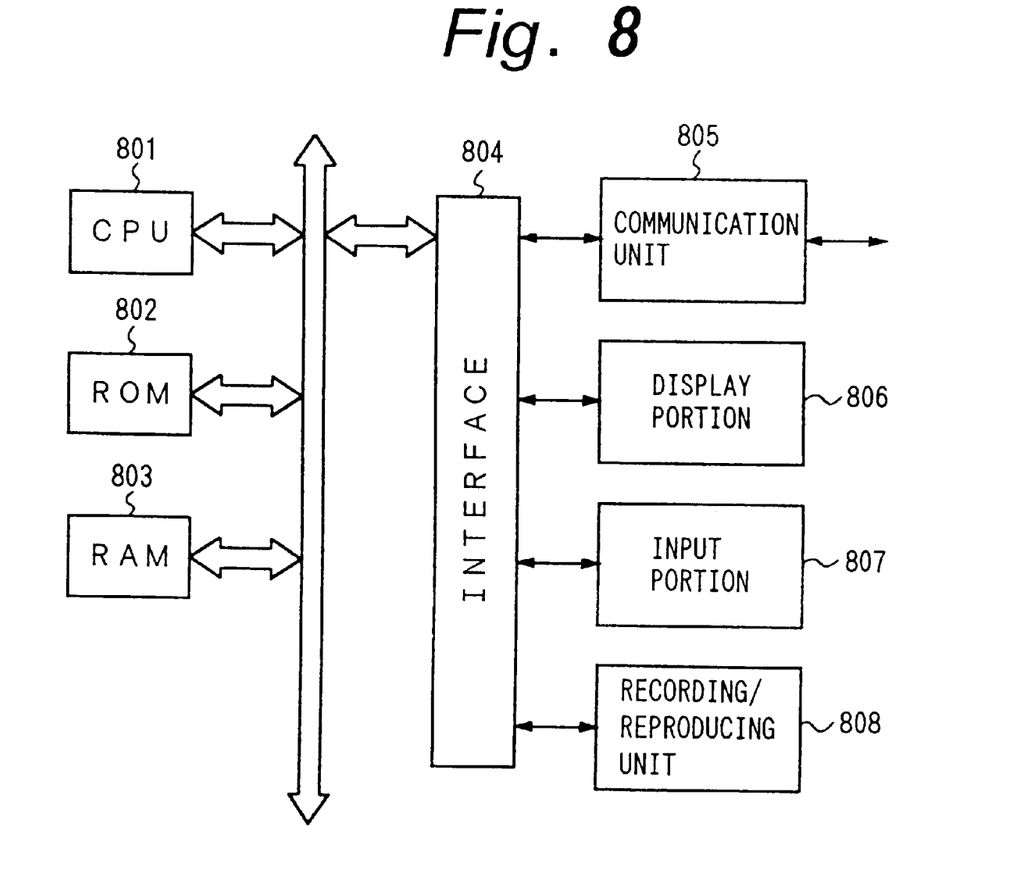
FIG. 8 is a block diagram showing another example of the construction of a PS according to the present invention.
Figure 10:
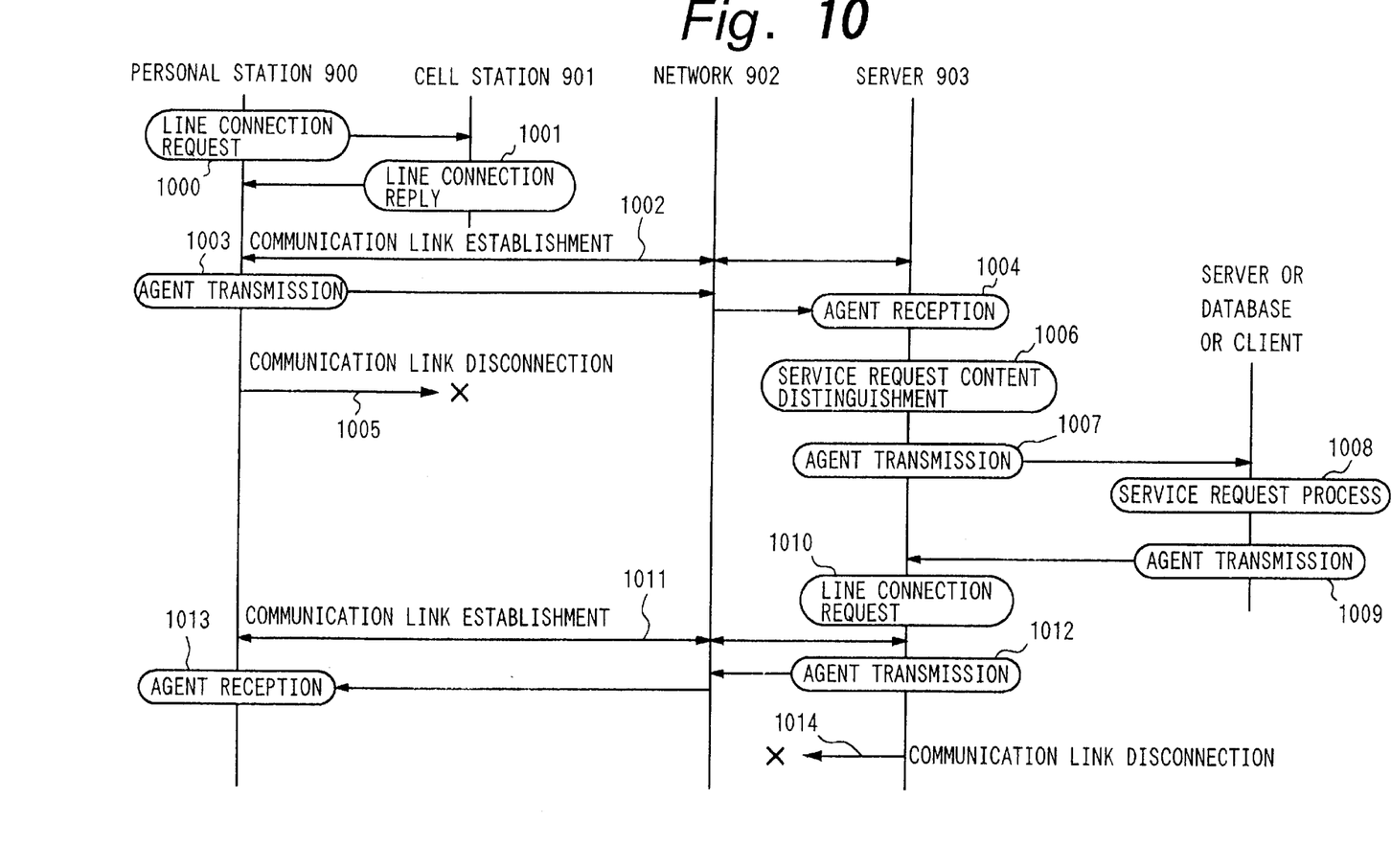
FIG. 10 is a flow chart showing a service request method according to the present invention.

FIG. 10 shows an example of a sequence of the operation of an information providing system according to the present invention. FIG. 8 shows the construction of the personal station (PS) according to the embodiment of the present invention. In FIG. 8, the PS comprises a CPU 801, memories 802 and 803, a communication unit 805, a display portion 806, an input portion 807, a recording/reproducing unit 808, and an interface 804.

Figure 9:
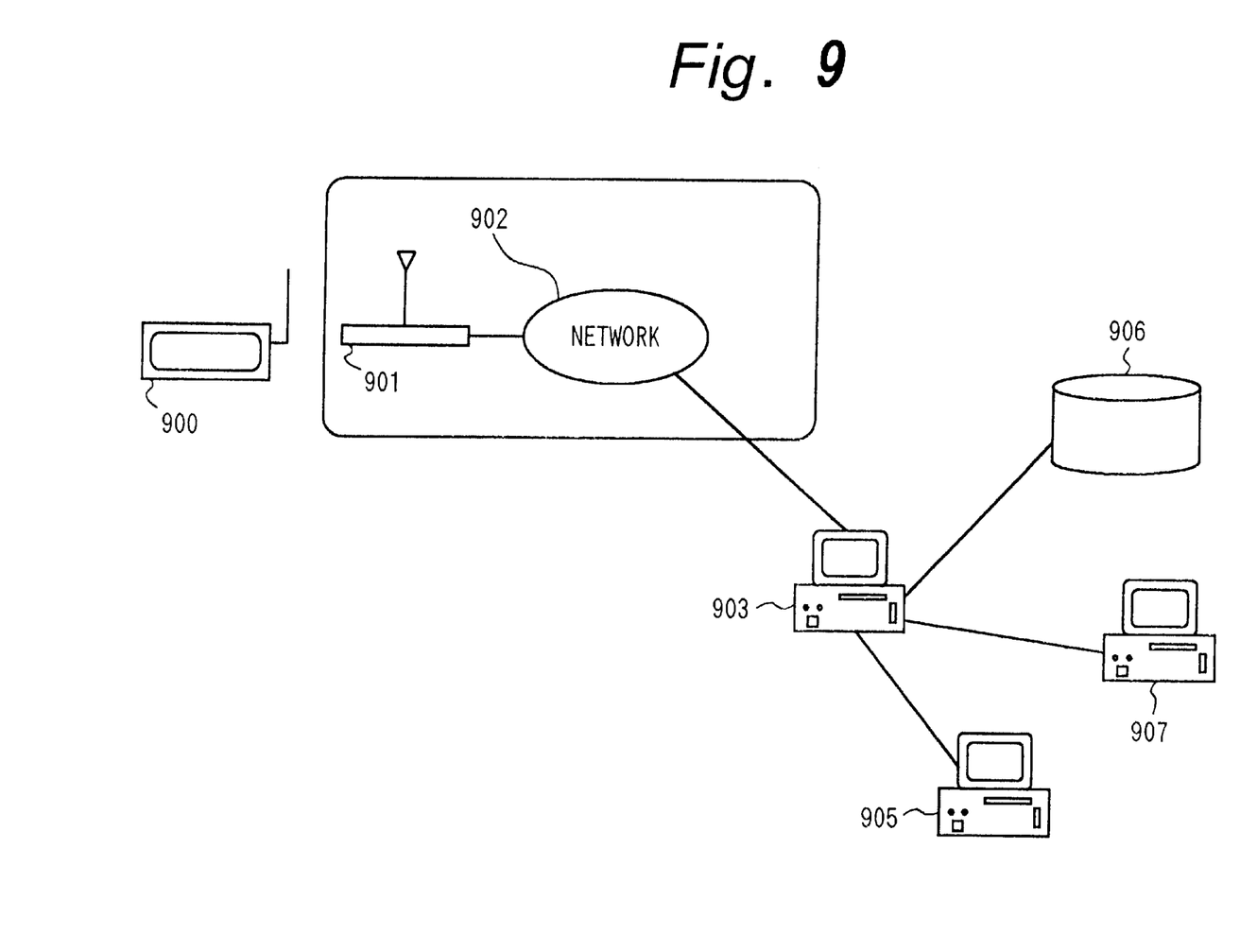
FIG. 9 is a block diagram showing an example of the construction of the PHS using the conventional PS.

Next, with reference to FIGS. 9 and 10, the PS according to the embodiment will be described in detail.

At step 1000, the user accesses a server 903 of a service provider with a personal station 900. At this point, the personal station 900 establishes a radio communication link with an adjacent cell station 901. When a radio communication link channel has been established, the cell station 901 sends a radio communication link channel establishment reply to the personal station 900 at step 1001. Thus, the radio communication link is established between the personal station 900 and the cell station 901. Thus, a communication link is established between the server 903 and the personal station 900 through a network 902. At step 1003, the personal station 900 sends a service request agent to the server 903. At this point, the service request agent includes the cell station ID number of the cell station 901 with which the radio communication link has been established, the user subscriber number, the service type, and so forth.

When the cell station 901 has received the agent from the personal station 900 at step 1004, the personal station 900 disconnects the communication link at step 1005. Alternatively, the server 903 can disconnect the communication link. At step 1006, the server 903 that has received the agent from the user sends the agent, which includes the cell station ID number, the subscriber number, and additional information, to a sub-server, a database, or a client corresponding to the service that the user has requested.

When the server 903 sends the agent to a database, as shown in FIG. 10, a process corresponding to the service request received from the user is performed at step 1008 and the agent that includes the service request reply information is sent to the server 903 (at step 1009). When the server 903 sends an agent to a client, since there are a plurality of clients, the agent is sent to all the clients at step 1007. Each client performs a service request process (at step 1008) and an agent sending process (at step 1009). At step 1009, each client sends an agent including service request reply information to the server 903.

The server 903 that has received agents from the individual clients selects client information that accords with all service request reply information or a service request condition received from the user and generates a reply agent to be sent to the user. When the server 903 sends an agent to a sub-server, the sub-server sends a service request agent received from the user to each client and receives a reply agent from each client. After the sub-server receives a reply agent from each client, the sub-client selects client information that accords with all service request reply information or a service request condition received from the user to the server 903.

A client or a database can determine the present location of the user corresponding to the cell station ID number received from the user. As shown in FIGS. 4A, 4B, 4C and 4D, when the cover area of the PHS cell station is an area of a circle with a radius of approximately 100 meters and the radio communication link is established between the PS 400 and the CS 401, it can be determined that the user is present in the area. However, the client or database should have stored location information such as addresses corresponding to cell station ID numbers.

When required reply information has been collected, the server 903 connects the line to the personal station 900 and sends reply information thereto at step 1010. After the communication link is established at step 1011, the server 903 sends an agent that includes service reply information to the personal station 900 at step 1012. After the server 903 has determined that the personal station 900 has received the agent at step 1014, the server 1014 disconnects the communication link at step 1014. It should be noted as with step 1005, the personal station 900 can disconnect the communication link.

As described above, according to the present invention, since the detecting circuit that detects the location of the PS corresponding to communication carriers or control carriers of CS of the PHS and CS-IDs designated to individual CS is provided, the user can precisely obtain the location information of the PS. In addition, due to the same reason, the user can obtain the moving direction of the PS. Thus, the user can perform a navigation.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A personal station for performing a navigation operation, comprising:

detecting means for detecting the location of the personal station corresponding to control carriers or communication carriers received from cell stations and cell station numbers designated thereto;

a memory for storing location information;

registering means for registering present location of a user of the personal station;

means for determining whether the location information obtained from said detecting means corresponds to a cell station number of a cell station most adjacent to the present location of the user, said determining means comprising means for comparing said location information obtained from said detecting means with a cell station number transmitted when a radio link is established with a cell station so as to determine any one of a direction in which the user is moving and a distance from the present location to a desired location; and display means for displaying the present location corresponding to the location information.

2. The personal station as set forth in claim 1, wherein said detecting means is adapted for detecting the location corresponding to variation of intensities of the communication carriers received from the cell stations.

3. The personal station as set forth in claim 1, wherein said detecting means includes azimuth detecting means for calculating the angle between adjacent cell stations viewed from the user so as to detect the location corresponding to the distance between the cell stations calculated corresponding to the angle.

4. The personal station as set forth in claim 1, wherein said detecting means is adapted for detecting the location corresponding to times or phases of the control carriers or communication carriers received from the cell stations and time difference or phase difference thereof.

5. The personal station as set forth in claim 1, wherein said registering means is adapted for registering the address and location information of a destination.

6. The personal station as set forth in claim 1, wherein the navigation is an operation for informing the user of the route to the destination and the present location.

7. The personal station as set forth in claim 1, wherein said memory is adapted for storing locations of cell stations with cell station numbers.

8. The personal station as set forth in claim 1, wherein said display means is adapted for displaying location information in the vicinity of a cell station most adjacent to the user in initial registration state.

9. The personal station as set forth in claim 5 wherein said display means is adapted for displaying the location of the destination stored in said memory corresponding to the address of the destination and location information registered in said registering means.

10. The personal station as set forth in claim 1, wherein said detecting means is adapted for detecting the location corresponding to an elapse time counted by a timer.

11. The personal station as set forth in claim 5, further comprising:

calculating means for calculating the distance from the location detected by said detecting means and the destination registered in said registering means, wherein said display means is adapted for displaying the distance.

12. An information providing system having a personal station, comprising:

detecting means for detecting the location of the personal station corresponding to control carriers or communication carriers received from cell stations and cell station numbers designated thereto;

a memory for storing location information;

registering means for registering present location of a user of the personal station;

means for determining whether the location information obtained from said detecting means corresponds to a cell station number of a cell station most adjacent to the present location of the user, said determining means comprising means for comparing said location information obtained from said detecting means with a cell station number transmitted when a radio link is established with a cell station so as to determine any one of a direction in which the user is moving and a distance from the present location to a desired location;

display means for displaying the present location corresponding to the location information;

a server connected to a cell station; and a database connected to said server.

13. An information providing system having a personal station, comprising:

detecting means for detecting the location of the personal station corresponding to control carriers or communication carriers received from cell stations and cell station numbers designated thereto;

a memory for storing location information;

registering means for registering present location of a user of the personal station;

means for determining whether the location information obtained from said detecting means corresponds to a cell station number of a cell station most adjacent to the present location of the user, said determining means comprising means for comparing said location information obtained from said detecting means with a cell station number transmitted when a radio link is established with a cell station so as to determine any one of a direction in which the user is moving and a distance from the present location to a desired location;

display means for displaying the present location corresponding to the location information;

a first server connected to a cell station; and a second server connected to said first server.

14. The personal station as set forth in claim 1, wherein said detecting means re-detects the location of the personal station if said means for determining determines that the location information corresponds to a cell station number of a cell station not most adjacent to the present location of the user.

* * * * *